(12) United States Patent
Chhaunker et al.

(10) Patent No.: US 8,935,499 B2
(45) Date of Patent: Jan. 13, 2015

(54) INTERFACE FOR MANAGEMENT OF DATA MOVEMENT IN A THIN PROVISIONED STORAGE SYSTEM

(75) Inventors: Gaurav Chhaunker, Pune (IN); Roy Subhojit, Pune (IN)

(73) Assignee: International Business Machines Corporation, Armonk, NY (US)

( * ) Notice: Subject to any disclaimer, the term of this patent is extended or adjusted under 35 U.S.C. 154(b) by 509 days.

(21) Appl. No.: 13/274,684

(22) Filed: Oct. 17, 2011

(65) Prior Publication Data

US 2013/0097399 A1 Apr. 18, 2013

(51) Int. Cl.
- *G06F 12/00* (2006.01)
- *G06F 12/08* (2006.01)
- *G06F 13/00* (2006.01)

(52) U.S. Cl.
CPC .............. *G06F 12/00* (2013.01); *G06F 12/08* (2013.01); *G06F 13/00* (2013.01)
USPC .......................................... 711/165; 711/161

(58) Field of Classification Search
CPC ... G06F 3/0665; G06F 3/0635; G06F 3/0662; G06F 3/0631; G06F 3/0647; G06F 3/065; G06F 3/0646
See application file for complete search history.

(56) References Cited

U.S. PATENT DOCUMENTS

| | | | |
|---|---|---|---|
| 7,162,600 B2 | 1/2007 | Kano et al. | |
| 7,640,410 B2 | 12/2009 | Zohar et al. | |
| 7,685,399 B2 | 3/2010 | Garrison | |
| 7,904,681 B1 | 3/2011 | Bappe et al. | |
| 2008/0168253 A1 | 7/2008 | Garrison | |
| 2009/0125680 A1* | 5/2009 | Ninose et al. | 711/114 |
| 2010/0082715 A1 | 4/2010 | Dohm et al. | |
| 2010/0082765 A1 | 4/2010 | Murase | |
| 2010/0191783 A1* | 7/2010 | Mason et al. | 707/822 |

OTHER PUBLICATIONS

Combined Search and Examination Report dated Feb. 26, 2013 for Application No. GB1218309.1.
Examination Report dated Jan. 21, 2014, pp. 2, for Application No. 1218309.1 filed Oct. 12, 2012.

* cited by examiner

*Primary Examiner* — Reginald Bragdon
*Assistant Examiner* — Thanh D Vo
(74) *Attorney, Agent, or Firm* — Rabindranath Dutta; Konrad Raynes Davda & Victor LLP (57) ABSTRACT

A computational device receives a request to copy a source logical block of a thin provisioned source logical unit to a target logical block of a thin provisioned target logical unit, wherein in thin provisioned logical units physical storage space is allocated in response to a write operation being performed but not during creation of the thin provisioned logical units. The computational device generates metadata that stores a correspondence between the source logical block and the target logical block, while avoiding allocating any physical storage space for the target logical block in the thin provisioned target logical unit.

17 Claims, 7 Drawing Sheets

INTERFACE FOR MANAGEMENT OF DATA MOVEMENT IN A THIN PROVISIONED STORAGE SYSTEM

BACKGROUND

1. Field

The disclosure relates to a method, system, and article of manufacture for an interface for the management of data movement in a thin provisioned storage system.

2. Background

A storage system may be comprised of a storage controller that controls a plurality of physical storage devices. The plurality of physical storage devices may include hard disks, solid state disks, tapes, etc. The storage controller may configure the plurality of physical storage devices into a plurality of logical storage devices comprising a plurality of storage volumes.

In a storage system, a logical unit number or LUN is a number used to identify a logical unit. A logical unit is a logical storage device addressed by a storage protocol, such as Small Computer System Interface (SCSI), Fibre Channel, Internet Small Computer System Interface (iSCSI), etc., that may be used in the storage system.

Data movement operations within the storage system may occur for a variety of reasons, including the movement of a file from one file system to another, the defragmentation of a file system, the alignment of blocks, etc. Data movement operations may involve moving data from a source logical unit (LUN) to a target LUN. While copying data from a source LUN to a target LUN, the data may first have to be copied from the source LUN to the host memory, and then the data may be written to the desired destination on the target LUN by copying the data from the host memory to the target LUN.

Thin provisioning mechanisms may apply to storage systems. A storage system that uses thin provisioning may be referred to as a thin provisioned storage system. Thin provisioning allocates storage (e.g., physical disk blocks or other equivalent elements of storage capacity) when application data is effectively written to a host attached storage volume. This is the difference with the traditional, fully provisioned storage volume, where the storage volume capacity is entirely allocated at the time the storage volume is created. If fully provisioned storage volumes are used, then the host to which the fully provisioned storage volume is attached owns the full storage capacity, and this consumes additional storage in the back-end system.

A storage volume supporting thin provisioning is referred to as a space efficient storage volume. At the time the space efficient storage volume is created, the storage volume is created as if it is able to provide the full capacity requested by the user, but because the actual allocation of storage space will only take place with the first host write to the storage volume, this capacity is a virtual capacity. All Input/Output (I/O) activities performed by the storage system to allocate space when needed are fully transparent to the host.

SUMMARY OF THE PREFERRED EMBODIMENTS

Provided are a method, a system, a computer program product, and a network in which a computational device receives a request to copy a source logical block of a thin provisioned source logical unit to a target logical block of a thin provisioned target logical unit, wherein in thin provisioned logical units physical storage space is allocated in response to a write operation being performed but not during creation of the thin provisioned logical units. The computational device generates metadata that stores a correspondence between the source logical block and the target logical block, while avoiding allocating any physical storage space for the target logical block in the thin provisioned target logical unit.

In further embodiments, a storage management application executing in the computational device provides an application programming interface to remap physical storage that is currently mapped to the source logical block of the thin provisioned source logical unit to be mapped to the target logical block of the thin provisioned target logical unit, without physically moving data from the thin provisioned source logical block to the thin provisioned target logical unit.

In yet further embodiments, a storage management application executing in the computational device provides an application programming interface to swap physical storage that is currently assigned to the source logical block of the thin provisioned source logical unit to be swapped with physical storage assigned to a target logical block of the thin provisioned target logical unit, wherein execution of the application programming interface executes the swap atomically.

In still further embodiments, an application programming interface that allows virtual data movement from the thin provisioned source logical unit to the thin provisioned target logical unit, without actually performing any physical movement of data from the thin provisioned source logical unit to the thin provisioned target logical unit, is provided to exploit characteristics of thin provisioning systems to provide mappings between virtual and physical blocks.

In certain embodiments, in response to a reconfiguration of the thin provisioned source logical unit or the thin provisioned target logical unit as fully provisioned, data stored in the source logical block is physically copied to the target logical block.

In further embodiments, the thin provisioned source logical unit and the thin provision target logical unit are logical representations of storage maintained in one or more physical storage devices coupled to the computational device. The source logical block is a logical subdivision of the thin provisioned source logical unit. The target logical block is a logical subdivision of the thin provisioned target logical unit.

In certain embodiments, the network is configured to provide a cloud computing environment in which the computational device provides computational processing and storage services.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Data Movement in Storage Systems

If some or all data movements are avoided in storage systems significant improvement in performance may occur. In enterprise storage systems environments, mechanisms to smartly manage data and avoid unnecessary data movement overheads may significantly improve the performance of the storage system. Also, with the explosion of data, such as, digital photographs, digital video, etc., storage performance and reduction of storage requirements have become major factors in selecting a storage vendor, and users may prefer to select storage vendors that provide storage systems that avoid unnecessary data movements and also avoid wastage of storage.

It may be noted that if data replication is enabled in a data center, any write to the replicated data volumes may have to be replicated over an expensive network link to a remote storage system. Therefore if data movement is reduced, it also results in bandwidth savings over the data replication link.

Certain systems perform copy operations, such as movement of files across file systems, etc., by reading data from the storage system to the host memory and writing the data back to a new location on the storage system. In certain situations, it may take a significant amount of time to execute these operations and valuable bandwidth may be wasted to read and write data because more data has to be sent across the replication link.

Virtual Data Movement in Thin Provisioning Systems

Certain embodiments exploit the ability of the thin provisioning systems to map physical storage to virtual address space, by providing an application programming interface (API) that allows virtual data movement from a source logical block address of a source logical unit to a target logical block of a target logical unit, without actually performing any physical movement of data from the source logical unit to the target logical unit.

Exemplary Embodiments

Figure 1:
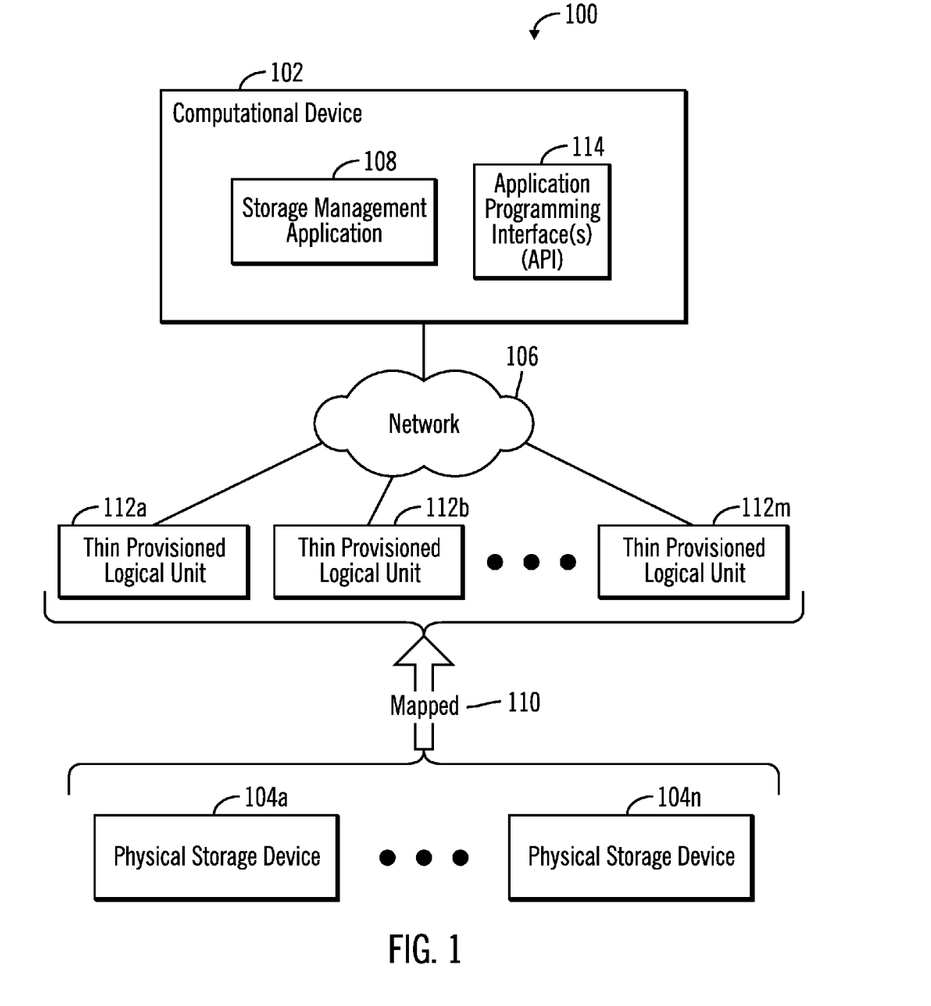
FIG. 1 illustrates a block diagram of a computing environment that includes a computational device coupled to a plurality of physical storage devices over a network, in accordance with certain embodiments.

FIG. 1 illustrates a block diagram of a computing environment 100 that includes a computational device 102 coupled to a plurality of physical storage devices 104a . . . 104n over a network 106, in accordance with certain embodiments.

The computational device 102 may comprise any suitable computational device including those presently known in the art, such as, a personal computer, a workstation, a server, a mainframe, a hand held computer, a palm top computer, a telephony device, a network appliance, a blade computer, a server, etc. The physical storage devices 104a . . . 104n may comprise any suitable storage devices, such as, hard disks, solid state disks, linear storage devices, etc. The computational device 102 and the physical storage devices 104a . . . 104n may communicate over the network 106, where the network 106 may comprise any suitable network, such as, the Internet, a storage area network, a wide area network, a local area network, etc. In certain embodiments, the computational device 102 may be implemented in a cloud computing environment and may provide processing and storage services to users.

The computational device 102 executes a storage management application 108 that controls the plurality of storage devices 104a . . . 104n. In certain embodiments, the storage management application 108 or some other application may have mapped (reference numeral 110) the plurality of physical storage devices 104a . . . 104n into a plurality of thin provisioned logical units (LUN) 112a, 112b, . . . , 112m. The thin provisioned logical units 112a . . . 112m may comprise space efficient storage volumes, and these space efficient storage volumes save storage space when storage space is only potentially or temporarily needed. Without the use of space efficient storage volumes, target storage volumes consume the same physical capacity as source storage volumes. When a normal storage volume is created, it occupies the defined capacity on the physical drives. A space efficient storage volume does not occupy physical capacity when it is initially created. Space gets allocated when data is actually written to the space efficient storage volume, which allows the target storage volume capacity to be thinly provisioned (in other words, smaller than the full capacity of the source storage volume). Therefore, an administrator can initially provision less storage capacity, which can help lower the amount of physical storage that is needed by many installations.

The storage management application 108 that executes in the computational device 102 may in certain embodiments implement one or more application programming interfaces (API) 114. The application programming interfaces 114 may allow data to be moved from a thin provisioned source logical unit to a thin provisioned target logical unit, without physically copying the data stored in one or more physical storage devices.

Figure 2:
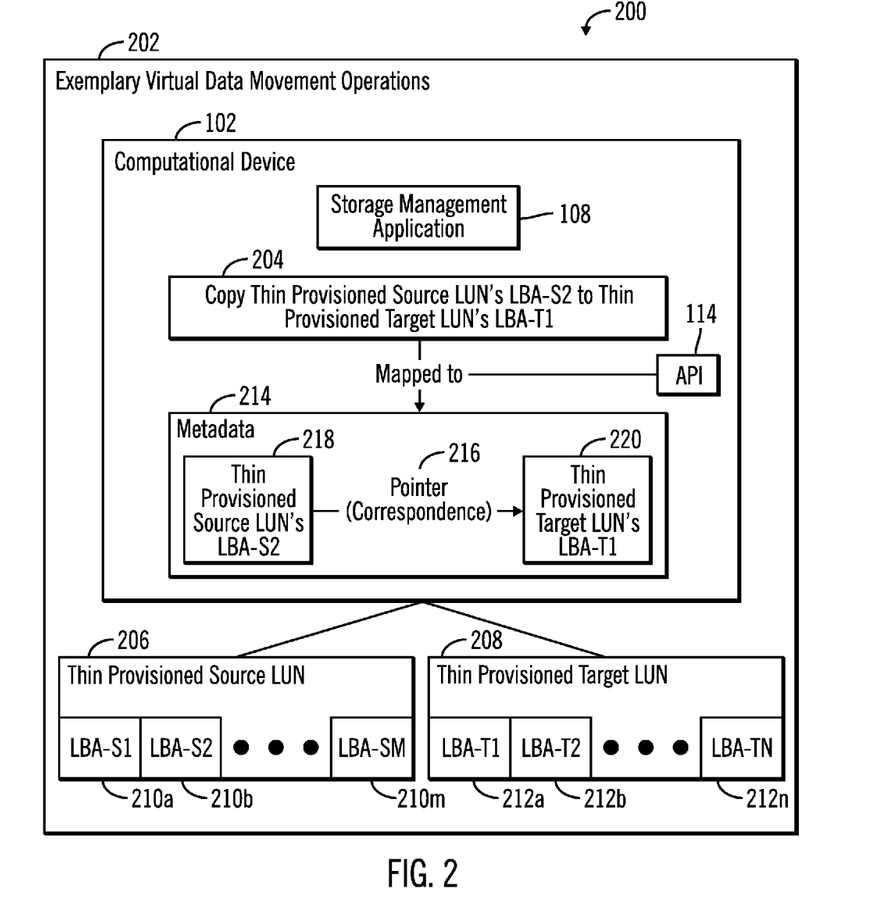
FIG. 2 illustrates a block diagram that shows mapping of exemplary virtual data movement operations, in accordance with certain embodiments.

FIG. 2 illustrates a block diagram 200 that shows exemplary virtual data movement operations 202, in accordance with certain embodiments. The exemplary virtual data movement operations illustrated in FIG. 2 may be performed by the storage management application 108 that executes in the computational device 102.

The storage management application 108 may receive a command 204 to copy one or more logical blocks from a thin provisioned source logical unit 206 to a thin provisioned target logical unit 208. The thin provisioned source logical unit 206 may comprise a plurality of logical blocks stored in logical block addresses 210a, 210b, . . . 210m, and the thin provisioned target logical volume 208 may comprise a plurality of logical blocks stored at logical blocks addresses 212a, 212b, . . . 212n. For example, logical blocks addresses LBA-S1, LBA-S2, LBA-SM of the thin provisioned source logical unit 206 are shown via reference numerals 210a, 210b, 210m respectively, and logical block addresses LBA-T1, LBA-T2, LBA-TN of thin provisioned target logical unit 208 are shown via reference numerals 212a, 212b, 212n respectively.

In certain exemplary embodiments, the storage management application 108 receives a command 204 to copy blocks stored at thin provisioned source logical unit's LBA-S2 210b to thin provisioned target logical unit's LBA-T1 212a. In response, the storage management application 108 uses the application programming interfaces 114 to generate the metadata 214. In the metadata 214, a pointer 216 may provide a correspondence between the thin provisioned source logical unit's LBA-S2 (shown via reference numeral 218) and the thin provisioned target logical unit's LBA-T1 (shown via reference numeral 220). No blocks of data are physically copied from the thin provisioned source logical unit 206 to the thin provisioned target logical unit 208. The pointer 216 indicates that data that was intended to be copied (but was actually not copied) to the thin provisioned target logical unit's LBA-T1 220 is actually stored in thin provisioned source logical unit's LBA-S2 218. If a read request is received for data that was intended to be copied to LBA-T1 212a of the thin provisioned target logical unit 208, that data is provided by the storage management application 108 from the thin provisioned source logical unit's LBA-S1 210a after processing the metadata 214 that includes the pointer 216.

Figure 3:
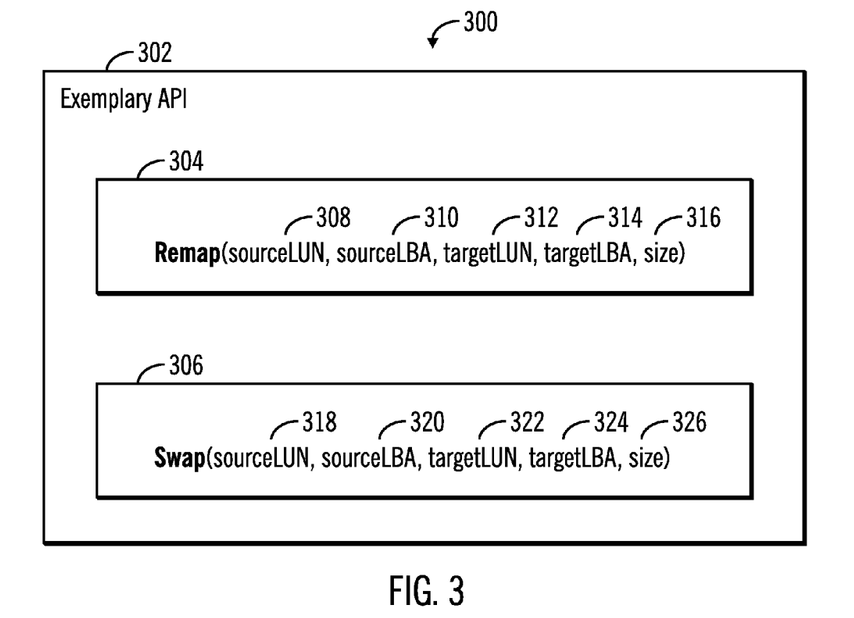
FIG. 3 illustrates a block diagram that shows exemplary application programming interfaces, in accordance with certain embodiments.

FIG. 3 illustrates a block diagram 300 that shows exemplary application programming interfaces 302, in accordance with certain embodiments. The exemplary application programming interfaces 302 may be examples of the application programming interfaces 114 shown in FIGS. 1 and 2.

In FIG. 3, two different application programming interfaces (API) are shown. A first application programming interface is the Remap API 304 and the second application programming interface is the Swap API 306.

The Remap API 304 allows physical storage currently mapped to a source logical unit's (sourceLUN parameter 308) source logical block address (sourceLBA parameter 310) to be mapped to a specified target logical unit's (targetLUN parameter 312) target logical block address (targetLBA parameter 314) without involving any data read or write operation by the application. The logical representation of the Remap API 304 is as follows (where the size parameter 316 is the size of the block to be mapped):
remap(sourceLun, sourceLBA, targetLUN, targetLBA, size).

The swap API 306 allows physical storage assigned to a source logical unit's (sourceLUN parameter 318) source logical block address (sourceLBA parameter 320) to be virtually swapped with the physical storage assigned to a specified target logical unit's (targetLUN parameter 322) target logical block address (targetLBA parameter 324) for a specified size (size parameter 326), atomically. The logical representation of the Swap API 306 is as follows:
swap(sourceLun, sourceLBA, targetLUN, targetLBA, size)

In certain embodiments the source logical unit and the target logical unit may be different logical units. In certain other embodiments, the Remap and Swap API's may be used on logical block addresses located within the same logical unit. However, the source and target logical units are part of the same storage array.

In situations where data replication is configured on the underlying storage array, the exemplary APIs 302 may be applied so that the move operations can be achieved without moving data over the replication link to remote storage thus saving significant amounts of replication bandwidth. The same capability provided by APIs 302 may be employed by storage that is configured as a log structured array.

Using the above API 302, applications, such as, file systems, can remap physical storage currently mapped to a source LUN, to a target LUN, thus enabling certain filesystem operations to be executed without any actual data movement.

An illustration of how the APIs 302 can save physical data movement is shown below:
(1) File system (F1) on top of LUN=LUN1 has a file /a located on LBA=LBA1 and is of size 4k.
(2) This file (file /a) has to be moved to a different file system (F2) created on top of LUN=LUN2 located on the same disk array.
(3) F2 determines that the new LBA=L2 for the file to be moved. This is determined based upon the availability of free blocks on F2.
(4) Under full provisioning, file data of size 4k will be copied from {LUN1, LBA1} [i.e., from LBA1 on LUN1] to {LUN2, LBA2} when the command "move /f1/a/f2/a" is executed because this move operation involves a move across file systems.
(5) However, under thin provisioning, with the use of the APIs 302, this file movement (across two separate file systems) can be achieved by invoking the Remap API 304 as follows:
remap(LUN1, LBA1, LUN2, LBA2, 4k).
It should be noted that one "move" operation (a single file move) can internally involve one or more remap calls depending on the file size and allocation unit size of the target and source file systems. The above API call is internally interpreted by the thin provisioned disk array to remap physical storage thus far mapped to {LUN1, LBA1} to be mapped to {LUN2, LBA2}, eliminating the need to physically copy data from LUN1 to LUN2.
(6) The file system F2 can now access the same file with reduced overheads by avoiding the time needed for copying. The above is possible because in thin provisioned storage arrays virtual LBAs are mapped to physical storage as needed and therefore it is possible for physical storage to be remapped to a new LBA as and when needed. Similarly, the above APIs 302 can be invoked by any application where data movement is needed across LUNs that are located within the same disk array that supports thin provisioning. The application may be a file system or a database on a host. It may also be noted that the APIs 302 including the Remap API 304 may be available in the form of an exemplary SCSI command that an operating system or other applications can execute. In certain embodiments, the name of an exemplary SCSI command can be REMAP and may include all the parameters mentioned in the Remap API 304 or other equivalent parameters.

Figure 4:
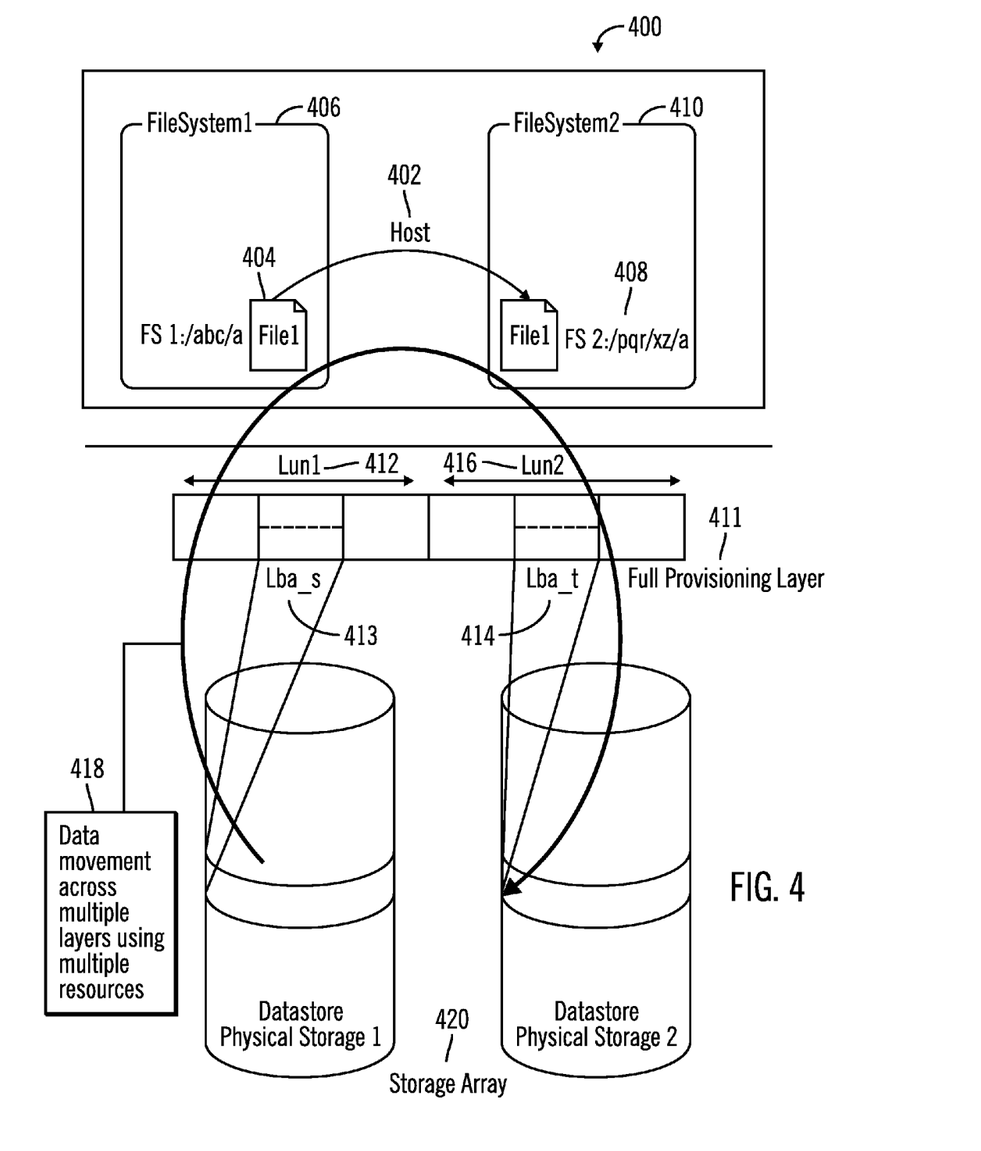
FIG. 4 illustrates a block diagram that shows data movement across multiple layers using multiple resources, in accordance with certain embodiments.

FIG. 4 illustrates a block diagram 400 that shows data movement across multiple layers using multiple resources, in accordance with certain embodiments. In FIG. 4, when a host 402 copies a file 404 located in a file system 406, to another file system 410, and full provisioning 411 is used, data is moved, i.e., copied, within the storage array, across file systems, utilizing resources such as network bandwidth, etc., to copy the file 404 to location 408.

In FIG. 4, it can be seen that data is physically moved from logical block address 413 of logical unit 412 to logical block address 414 of logical unit 416. The data movement across multiple layers using multiple resources is shown via reference numeral 418 in the storage array 420.

Figure 5:
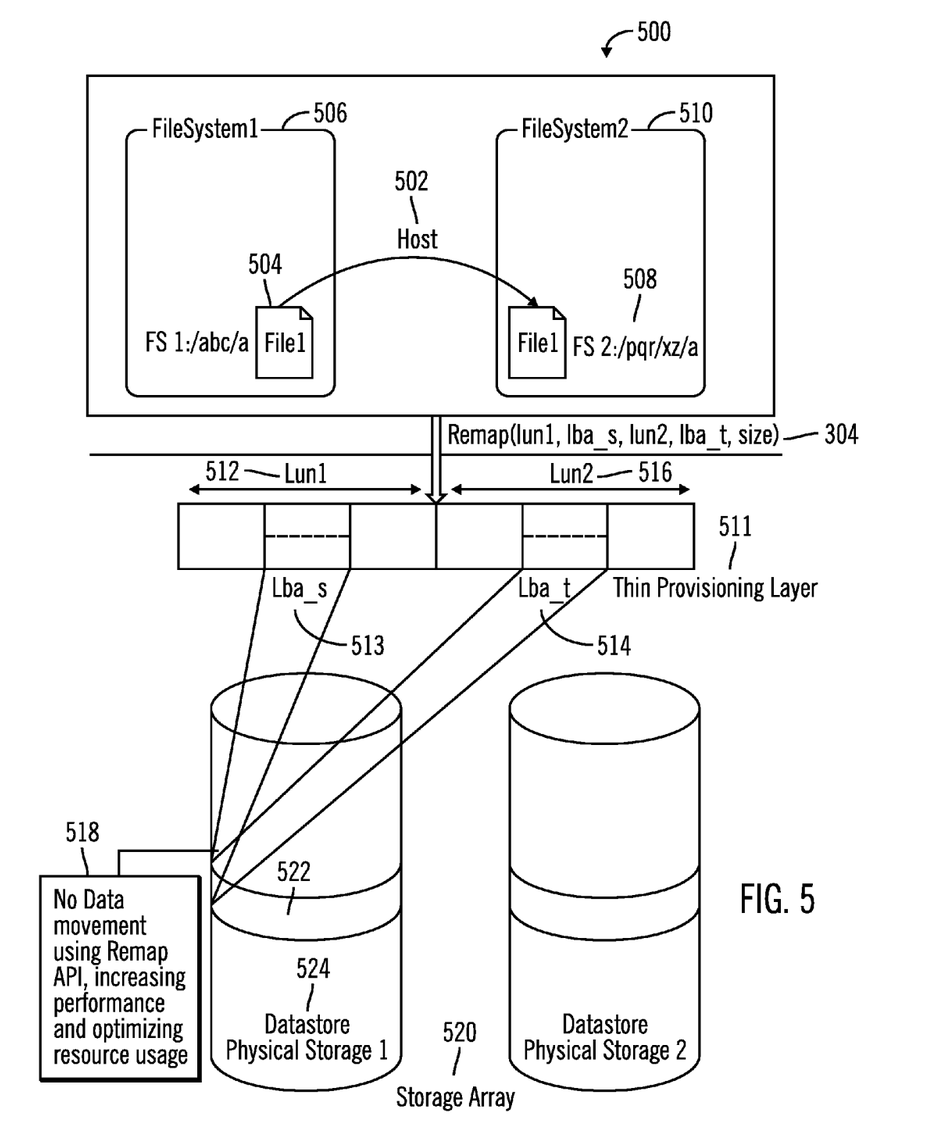
FIG. 5 illustrates a block diagram that shows how data movement is avoided by using the a Remap Application Programming Interface, in accordance with certain embodiments.

FIG. 5 illustrates a block diagram 500 that shows how data movement is avoided by using the Remap Application Programming Interface 304, in accordance with certain embodiments. In FIG. 5, when a host 502 processes a request to copy a file 504 located in a file system 506, to another file system 510, and thin provisioning 511 is used, data is not moved within the storage array, across file systems. Instead, it can be seen from block diagram 500, that by using the remap API 304, there is practically no data movement, except for updating the pointers in file system metadata. As a result, significant performance improvement and a more optimal usage of resources are achieved in a storage area network.

In FIG. 5, it can be seen that data is not physically moved from logical block address 513 of logical unit 512 to logical block address 514 of logical unit 516. The avoidance of data movement across multiple layers using multiple resources is shown via reference numeral 518 in the storage array 520. It can be seen that the Remap API 304 causes the target logical block address 514 and the source logical block address 513 to point to the same physical storage location 522 in physical storage 524.

Figure 6:
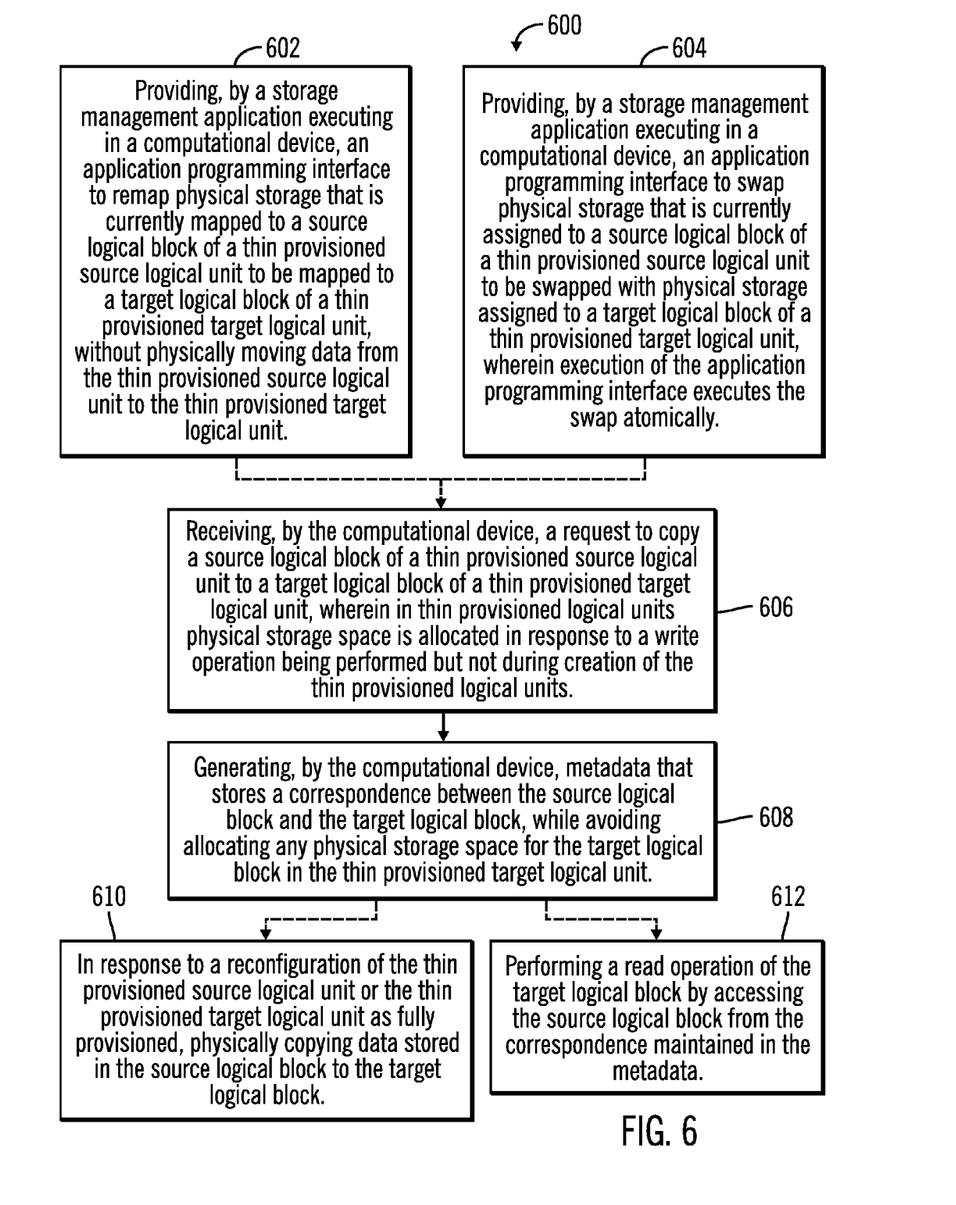
FIG. 6 illustrates a flowchart that shows certain operations, in accordance with certain embodiments.

FIG. 6 illustrates a flowchart 600 that shows certain operations, in accordance with certain embodiments. The operations shown in FIG. 6 may be implemented by the storage management application 108 that executes in the computational device 102.

Control starts, at block 602, in which the storage management application 108 that executes in the computational device 102 provides an application programming interface (e.g., the Remap API 304 shown in FIG. 3) to remap physical storage that is currently mapped to a source logical block of a thin provisioned source logical unit to be mapped to a target logical block of a thin provisioned target logical unit, without physically moving data from the thin provisioned source logical unit to the thin provisioned target logical unit, In parallel to execution of block 602, the storage management application 108 that executes in the computational device, 102 provides (at block 604) an application programming interface (e.g., the swap API 306 shown in FIG. 3) to swap physical storage that is currently assigned to a source logical block of a thin provisioned source logical unit to be swapped with physical storage assigned to a target logical block of a thin provisioned target logical unit, wherein execution of the application programming interface executes the swap atomically.

After the elapse of a period of time, control proceeds to block 606 from either block 602 or block 604. At block 606, the computational device 102 receives a request to copy a source logical block of a thin provisioned source logical unit 206 to a target logical block of a thin provisioned target logical unit 208, wherein in thin provisioned logical units physical storage space is allocated in response to a write operation being performed but not during creation of the thin provisioned logical units The computational device 102 generates (at block 608) metadata 214 that stores a correspondence 216 between the source logical block and the target logical block, while avoiding allocating any physical storage space for the target logical block in the thin provisioned target logical unit.

From block 608, control may proceed in parallel to block 610 or block 612. At block 610, in response to a reconfiguration of the thin provisioned source logical unit or the thin provisioned target logical unit as fully provisioned, data stored in the source logical block is physically copied to the target logical block.

At block 612, the storage management application 108 performs a read operation of the target logical block by accessing the source logical block from the correspondence 216 maintained in the metadata 214.

Certain embodiments shown in FIGS. 1-6 ensure that in thin provisioning systems, certain operations that may otherwise have resulted in physical data movement from one logical unit to another (within the same disk array) are substituted with remapping and swapping operations via pointers, where the physical data movement from source to target logical units is avoided.

In full provisioning systems, each data movement operation from one logical unit to another may cause data to be read from the source LUN into host memory and then written back to the target LUN. This involves bandwidth usage. Certain embodiments ensure that in thin provisioning systems, a number of operations that may otherwise have resulted in bandwidth intensive data movement are avoided, thus resulting in improved resource utilization and improved performance.

In full provisioning systems, data movement operation on a disk array results in new data to be replicated to a remote site if data replication is configured for the disk array. Certain embodiments save network bandwidth by ensuring that write operations are minimized. Reduction in data movement over the network and reduced reads and writes to disks ensure decreased power consumption thus ensuring greener data centers and significant cost savings.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied there.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java*, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

*Java is a trademark or registered trademark of Oracle and/or its affiliates.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 7:
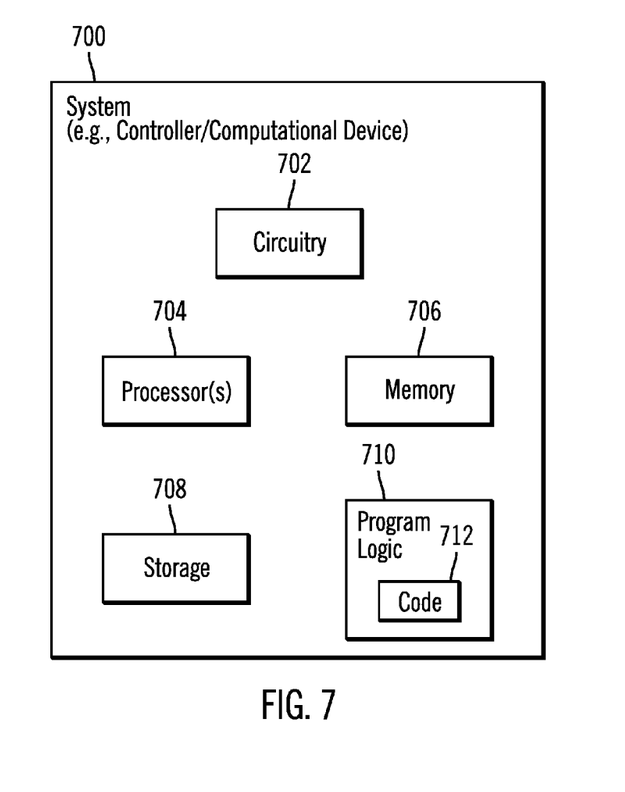
FIG. 7 illustrates a block diagram of a computational system that shows certain elements that may be included in the computational device of FIG. 1, in accordance with certain embodiments.

FIG. 7 illustrates a block diagram that shows certain elements that may be included in the computational device 102, in accordance with certain embodiments. The system 700 may comprise the computational device 102, and may include a circuitry 702 that may in certain embodiments include at least a processor 704. The system 700 may also include a memory 706 (e.g., a volatile memory device), and storage 708. The storage 708 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 708 may comprise an internal storage device, an attached storage device and/or a network accessible storage device. The system 700 may include a program logic 710 including code 712 that may be loaded into the memory 706 and executed by the processor 704 or circuitry 702. In certain embodiments, the program logic 710 including code 712 may be stored in the storage 708. In certain other embodiments, the program logic 710 may be implemented in the circuitry 702. Therefore, while FIG. 7 shows the program logic 710 separately from the other elements, the program logic 710 may be implemented in the memory 706 and/or the circuitry 702.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
    receiving, by a computational device, a request to copy a source logical block of a thin provisioned source logical unit to a target logical block of a thin provisioned target logical unit, wherein in thin provisioned logical units physical storage space is allocated in response to a write operation being performed but not during creation of the thin provisioned logical units; and
    generating, by the computational device, metadata that stores a correspondence via a pointer between the source logical block and the target logical block, without physically moving data from the thin provisioned source logical unit to the thin provisioned target logical unit;
    performing a read operation of the target logical block by accessing the source logical block from the correspondence maintained in the metadata; and
    in response to a reconfiguration of the thin provisioned source logical unit or the thin provisioned target logical unit as fully provisioned, physically copying data stored in the source logical block to the target logical block.

2. The method of claim 1, the method further comprising:
    providing, by a storage management application executing in the computational device, an application programming interface to remap physical storage that is currently mapped to the source logical block of the thin provisioned source logical unit to be mapped to the target logical block of the thin provisioned target logical unit, without physically moving data from the thin provisioned source logical unit to the thin provisioned target logical unit, wherein the application programming interface is comprised of parameters including a source logical unit number, a source logical block address, a target logical unit number, a target logical block address, and a size.

3. The method of claim 1, the method further comprising:
    providing, by a storage management application executing in the computational device, an application programming interface to swap physical storage that is currently assigned to the source logical block of the thin provisioned source logical unit to be swapped with physical storage assigned to a target logical block of the thin provisioned target logical unit, wherein execution of the application programming interface executes the swap atomically, wherein the application programming interface is comprised of parameters including a source logical unit number, a source logical block address, a target logical unit number, a target logical block address, and a size.

4. The method of claim 1, wherein an application programming interface that allows virtual data movement from the thin provisioned source logical unit to the thin provisioned target logical unit, without actually performing any physical movement of data from the thin provisioned source logical unit to the thin provisioned target logical unit, is provided to exploit characteristics of thin provisioning systems to provide mappings between virtual and physical blocks, wherein the application programming interface is comprised of parameters including a source logical unit number, a source logical block address, a target logical unit number, a target logical block address, and a size.

5. A system, comprising:
    a memory; and
    a processor coupled to the memory, wherein the processor performs operations, the operations comprising:
    receiving a request to copy a source logical block of a thin provisioned source logical unit to a target logical block of a thin provisioned target logical unit, wherein in thin provisioned logical units physical storage space is allocated in response to a write operation being performed but not during creation of the thin provisioned logical units; and
    generating metadata that stores a correspondence via a pointer between the source logical block and the target logical block, without physically moving data from the thin provisioned source logical unit to the thin provisioned target logical unit;
    performing a read operation of the target logical block by accessing the source logical block from the correspondence maintained in the metadata; and
    in response to a reconfiguration of the thin provisioned source logical unit or the thin provisioned target logical unit as fully provisioned, physically copying data stored in the source logical block to the target logical block.

6. The system of claim 5, wherein the system is a computational device, the operations further comprising:
    providing, by a storage management application executing in the computational device, an application programming interface to remap physical storage that is currently mapped to the source logical block of the thin provisioned source logical unit to be mapped to the target logical block of the thin provisioned target logical unit, without physically moving data from the thin provisioned source logical unit to the thin provisioned target logical unit, wherein the application programming interface is comprised of parameters including a source logical unit number, a source logical block address, a target logical unit number, a target logical block address, and a size.

7. The system of claim 5, wherein the system is a computational device, the operations further comprising:
    providing, by a storage management application executing in the computational device, an application programming interface to swap physical storage that is currently assigned to the source logical block of the thin provisioned source logical unit to be swapped with physical storage assigned to a target logical block of the thin provisioned target logical unit, wherein execution of the application programming interface executes the swap atomically, wherein the application programming interface is comprised of parameters including a source logical unit number, a source logical block address, a target logical unit number, a target logical block address, and a size.

8. The system of claim 5, wherein an application programming interface that allows virtual data movement from the thin provisioned source logical unit to the thin provisioned target logical unit, without actually performing any physical movement of data from the thin provisioned source logical unit to the thin provisioned target logical unit, is provided to exploit characteristics of thin provisioning systems to provide mappings between virtual and physical blocks, wherein the application programming interface is comprised of parameters including a source logical unit number, a source logical block address, a target logical unit number, a target logical block address, and a size.

9. A computer program product, the computer program product comprising a non-transitory computer readable storage medium having computer readable program code embodied therewith, the computer readable program code configured to perform operations in a computational device, the operations comprising:
receiving, by the computational device, a request to copy a source logical block of a thin provisioned source logical unit to a target logical block of a thin provisioned target logical unit, wherein in thin provisioned logical units physical storage space is allocated in response to a write operation being performed but not during creation of the thin provisioned logical units; and
generating, by the computational device, metadata that stores a correspondence via a pointer between the source logical block and the target logical block, without physically moving data from the thin provisioned source logical unit to the thin provisioned target logical unit;
performing a read operation of the target logical block by accessing the source logical block from the correspondence maintained in the metadata; and
in response to a reconfiguration of the thin provisioned source logical unit or the thin provisioned target logical unit as fully provisioned, physically copying data stored in the source logical block to the target logical block.

10. The computer program product of claim 9, the operations further comprising:
providing, by a storage management application executing in the computational device, an application programming interface to remap physical storage that is currently mapped to the source logical block of the thin provisioned source logical unit to be mapped to the target logical block of the thin provisioned target logical unit, without physically moving data from the thin provisioned source logical unit to the thin provisioned target logical unit, wherein the application programming interface is comprised of parameters including a source logical unit number, a source logical block address, a target logical unit number, a target logical block address, and a size.

11. The computer program product of claim 9, the operations further comprising:
providing, by a storage management application executing in the computational device, an application programming interface to swap physical storage that is currently assigned to the source logical block of the thin provisioned source logical unit to be swapped with physical storage assigned to a target logical block of the thin provisioned target logical unit, wherein execution of the application programming interface executes the swap atomically, wherein the application programming interface is comprised of parameters including a source logical unit number, a source logical block address, a target logical unit number, a target logical block address, and a size.

12. The computer program product of claim 9, wherein an application programming interface that allows virtual data movement from the thin provisioned source logical unit to the thin provisioned target logical unit, without actually performing any physical movement of data from the thin provisioned source logical unit to the thin provisioned target logical unit, is provided to exploit characteristics of thin provisioning systems to provide mappings between virtual and physical blocks, wherein the application programming interface is comprised of parameters including a source logical unit number, a source logical block address, a target logical unit number, a target logical block address, and a size.

13. A network, comprising:
a computational device; and
a plurality of physical storage devices coupled to the computational device, wherein the computational device controls data stored in the plurality of physical storage devices, and wherein the computational device provides computational processing and storage services to users over the network via performing of operations comprising:
receiving a request to copy a source logical block of a thin provisioned source logical unit to a target logical block of a thin provisioned target logical unit, wherein in thin provisioned logical units physical storage space is allocated in response to a write operation being performed but not during creation of the thin provisioned logical units; and
generating metadata that stores a correspondence via a pointer between the source logical block and the target logical block, without physically moving data from the thin provisioned source logical unit to the thin provisioned target logical unit;
performing a read operation of the target logical block by accessing the source logical block from the correspondence maintained in the metadata; and
in response to a reconfiguration of the thin provisioned source logical unit or the thin provisioned target logical unit as fully provisioned, physically copying data stored in the source logical block to the target logical block.

14. The network of claim 13, wherein the network is configured to provide a cloud computing environment in which the computational device provides the computational processing and storage services.

15. The network of claim 13, the operations further comprising:
providing, by a storage management application executing in the computational device, an application programming interface to remap physical storage that is currently mapped to the source logical block of the thin provisioned source logical unit to be mapped to the target logical block of the thin provisioned target logical unit, without physically moving data from the thin provisioned source logical unit to the thin provisioned target logical unit, wherein the application programming interface is comprised of parameters including a source logical unit number, a source logical block address, a target logical unit number, a target logical block address, and a size.

16. The network of claim 13, the operations further comprising:
providing, by a storage management application executing in the computational device, an application programming interface to swap physical storage that is currently assigned to the source logical block of the thin provisioned source logical unit to be swapped with physical storage assigned to a target logical block of the thin provisioned target logical unit, wherein execution of the application programming interface executes the swap atomically, wherein the application programming interface is comprised of parameters including a source logical unit number, a source logical block address, a target logical unit number, a target logical block address, and a size.

17. The network of claim 13, wherein an application programming interface that allows virtual data movement from the thin provisioned source logical unit to the thin provisioned target logical unit, without actually performing any physical movement of data from the thin provisioned source logical unit to the thin provisioned target logical unit, is provided to exploit characteristics of thin provisioning systems to provide mappings between virtual and physical blocks, wherein the application programming interface is comprised of parameters including a source logical unit number, a source logical block address, a target logical unit number, a target logical block address, and a size.

* * * * *